(12) United States Patent
Han et al.

(10) Patent No.: US 10,176,358 B2
(45) Date of Patent: Jan. 8, 2019

(54) FINGERPRINT SENSOR INTEGRATED TYPE TOUCH SCREEN PANEL

(71) Applicant: LG Display Co., Ltd., Seoul (KR)

(72) Inventors: Manhyeop Han, Seoul (KR); Kyoseop Choo, Suwon-si (KR); Moonbong Song, Seoul (KR)

(73) Assignee: LG Display Co., Ltd., Seoul (KR)

( * ) Notice: Subject to any disclaimer, the term of this patent is extended or adjusted under 35 U.S.C. 154(b) by 368 days.

(21) Appl. No.: 14/954,347

(22) Filed: Nov. 30, 2015

(65) Prior Publication Data

US 2016/0350571 A1    Dec. 1, 2016

(30) Foreign Application Priority Data

May 28, 2015  (KR) .................. 10-2015-0075400

(51) Int. Cl.
*G06F 3/041*  (2006.01)
*G06K 9/00*   (2006.01)
*G06F 3/044*  (2006.01)

(52) U.S. Cl.
CPC .......... *G06K 9/0002* (2013.01); *G06F 3/044* (2013.01); *G06F 3/0416* (2013.01)

(58) Field of Classification Search
CPC ........ G06K 9/0002; G06F 3/041; G06F 3/044
USPC ..................... 178/18.01–19.07; 345/173–178
See application file for complete search history.

(56) References Cited

U.S. PATENT DOCUMENTS 8,872,526 B1 * 10/2014 Hoshtanar ............ G06K 9/0002
                                                    324/658
2012/0105081 A1 * 5/2012 Shaikh ................. G06K 9/0002
                                                    324/686
2014/0333328 A1 * 11/2014 Nelson .................... G06F 3/044
                                                    324/663
2014/0362034 A1   11/2014 Mo et al.
2016/0188032 A1 * 6/2016 Lin ........................ G06F 3/044
                                                    345/174

FOREIGN PATENT DOCUMENTS

CN    103713782 A    4/2014
CN    104298911 A    1/2015

OTHER PUBLICATIONS

Second Chinese Office Action, Chinese Patent Application No. 201511035987.1, dated Nov. 2, 2018, 21 pages.

* cited by examiner

*Primary Examiner* — Michael Pervan
(74) *Attorney, Agent, or Firm* — Fenwick & West LLP

(57) ABSTRACT

A touch sensing device comprises touch electrodes having a first resolution for sensing touch in the active area. The touch sensing device also includes combination touch and fingerprint electrodes having a second resolution for sensing both touch and a fingerprint in the active area, the second higher than the first resolution. The touch sensing device also includes a touch and fingerprint controller that respectively applies a touch driving voltage for sensing touch to the plurality of touch electrodes and the plurality of combination touch and fingerprint electrodes during a touch driving mode of a touch period of the touch sensing device, and the touch and fingerprint controller applies a fingerprint driving voltage for sensing a fingerprint to the plurality of combination touch and fingerprint electrodes during a fingerprint mode of the touch period.

16 Claims, 6 Drawing Sheets

FINGERPRINT SENSOR INTEGRATED TYPE TOUCH SCREEN PANEL

CROSS-REFERENCE TO RELATED PATENT APPLICATIONS

This application claims priority under U.S.C. § 119(a) to Korean Patent Application No. 10-2015-0075400 filed on May 28, 2015, which is incorporated by reference herein in its entirety.

BACKGROUND

Field of Technology

This disclosure relates to a fingerprint sensor integrated type touch screen panel, in particular a fingerprint sensor integrated type touch screen panel capable of perceiving a fingerprint.

Discussion of the Related Art

In recent years, computer based systems applied to various utilities, such as tablet personal computers (PCs), smart phones, personal digital assistants (PDAs), automated teller machines (ATMs), and information systems have been developed according to growth of computer techniques. In general, the computer based systems store various data including secret information such as business information and business secrets as well as personal information related to private affairs. Accordingly, it is required to strengthen security to protect the secret information.

To this end, fingerprint sensors have been developed to strengthen security by performing system registration or certification using fingerprints of a human being.

The fingerprint sensor is a sensor capable of sensing fingerprints of a human being. The fingerprint sensor is classified into an optical fingerprint sensor and a capacitive fingerprint sensor.

The optical fingerprint sensor utilizes a principle in which a light source such as a light emitting diode (LED) emits light, and senses the light reflected from ridges and valleys of a fingerprint through CMOS image sensors. There are some problems such as an increase in size due to the use of LEDs and rise in product cost due to the use of expensive light source.

The capacitive fingerprint sensor utilizes difference of electric charges charged between ridges and valley of the finger contacted thereto.

U.S. Patent Publication No. 2013/0307818 published on Nov. 21, 2013, and entitled "Capacitive Sensor Package" is known as the related art capacitive fingerprint sensor.

The published capacitive fingerprint sensor is constructed as an assembly form engaged with a particular push button. The capacitive fingerprint sensor includes a silicon wafer to which a circuit for measuring an electrostatic capacitance between the fingerprint (ridges and valleys) and a capacitive plate is printed.

In general, it is necessary for the capacitive fingerprint sensor to have a high resolution sensor array and an integrated circuit (IC) for a fingerprint recognition because the finger's ridges and valleys have a very minute size of about 300 to about 500 To this end, the capacitive fingerprint sensor utilizes the silicon wafer for integrating the IC with the sensor array.

However, in case of integrating the IC with the high resolution sensor array using the silicon wafer as described in the US Patent Publication No. 2013/0307818, it is necessary for the capacitive fingerprint sensor to have an assembly construction for coupling the fingerprint sensor with a push button. Accordingly, there are some problems such as a complicated construction and an increase in bezel area (non-display area) in the optical fingerprint sensor due to the assembly construction. Also, there are other problems including the issue that thickness is increased and an area for sensing the fingerprint depends on the size of the push button (e.g., a home key of a smart phone) because the push button overlaps the fingerprint sensor.

To resolve the problems mentioned above, technologies have been developed for utilizing an area of a touch sensor screen as an area for identifying a fingerprint sensor. As the techniques, there are known U.S. Pat. No. 8,564,314 issued on Oct. 22, 2013 and entitled "Capacitive Touch Sensor for Identifying a Fingerprint", and Korea Patent No. 10-1432988 issued on Aug. 18, 2014 and entitled "Fingerprint Integrated type Capacitive Touch Screen".

FIG. 1 is FIG. 5 shown in U.S. Pat. No. 8,564,314, and is a plan view schematically illustrating an arrangement of driving electrodes and sensing electrodes of the capacitive sensing panel, and the FIG. 2 is the FIG. 2 shown in Korean Patent No. 10-1432988, and is a plan view illustrating the fingerprint sensor integrated type capacitive touch screen.

Referring to FIG. 1, the capacitive touch sensor includes a touch position sensor 403 and a fingerprint sensor 405. The touch position sensor 403 has touch driving electrodes 401(x) and touch sensing electrodes 401(y). However, in the capacitive touch sensor 400, the fingerprint sensor 405 is disposed only in a portion of the display area. Therefore, the area where the fingerprint sensor 405 is disposed cannot be acted as a touch area. Also, a touch performance may be degraded at a peripheral region of the fingerprint sensor 405.

Referring to FIG. 2, the fingerprint sensor integrated type capacitive touch screen includes a touch panel 110, electrode connecting lines 120 and a touch controller 130. The touch panel 110 includes fine channels 113 formed by combinations of the first channel electrodes 111 and the second channel electrodes 112. The fine channels 113 have first fine channels and second fine channels. The first fine channels are disposed in the display area excluding the region of the fingerprint sensor 114. The second fine channels are disposed in the region of the fingerprint sensor 114. The first fine channels are grouped in plural and functioned as touch channels 115. The second fine channels are functioned as fingerprint recognition channels 116. However, in the fingerprint sensor integrated type capacitive touch screen, mutual capacitances between the first channel electrodes 111 and the second channel electrodes 112 are significantly increased because of the second fine channels functioned as the touch channels 115. According to the increase of the mutual capacitance, touch sensibilities of the fingerprint sensor integrated type capacitive touch screen are degraded, thereby making touch recognition impossible when a touch event is performed.

SUMMARY

Embodiments of the invention provide a fingerprint sensor integrated type touch screen panel capable of preventing the fingerprint sensor region of the touch screen panel from being a dead zone as well as preventing touch sensibilities from being degraded due to the increase of the mutual capacitance.

According to exemplary embodiments of the invention, it is possible to design the fingerprint sensor integrated type touch screen panel having a narrow bezel area because it is unnecessary to have a fingerprint sensor region in the bezel area.

Also, it is possible to prevent a dead zone from being generated in a display area (or active area) of the fingerprint sensor integrated type touch screen panel because fingerprint/touch electrodes are arranged in a fingerprint/touch area of the display area to implement the touch/fingerprint recognitions.

Also, it is possible to prevent the touch sensibilities the fingerprint sensor integrated type touch screen panel from being degraded because the touch electrodes consist of large patterns and the fingerprint/touch patterns consist of fine patterns.

In one embodiment, a touch sensing device comprises a plurality of touch electrodes located in an active area of the touch sensing device, the plurality of touch electrodes having a first resolution for sensing touch in the active area. The touch sensing device also includes a plurality of combination touch and fingerprint electrodes located in the active area of the touch sensing device, the plurality of combination touch and fingerprint electrodes having a second resolution for sensing both touch and a fingerprint in the active area, the second resolution of the plurality of combination touch and fingerprint electrodes higher than the first resolution of the plurality of touch electrodes. The touch sensing device also includes a first plurality of routing lines connected to the plurality of touch electrodes and a second plurality of routing lines connected to the plurality of combination touch and fingerprint electrodes. The touch sensing device also includes a touch and fingerprint controller that respectively applies via the first plurality of routing lines and the second plurality of routing lines a touch driving voltage for sensing touch to the plurality of touch electrodes and the plurality of combination touch and fingerprint electrodes during a touch driving mode of a touch period of the touch sensing device, and the touch and fingerprint controller applying via the second plurality of routing lines a fingerprint driving voltage for sensing a fingerprint to the plurality of combination touch and fingerprint electrodes during a fingerprint mode of the touch period, the fingerprint mode not overlapping with the touch driving mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
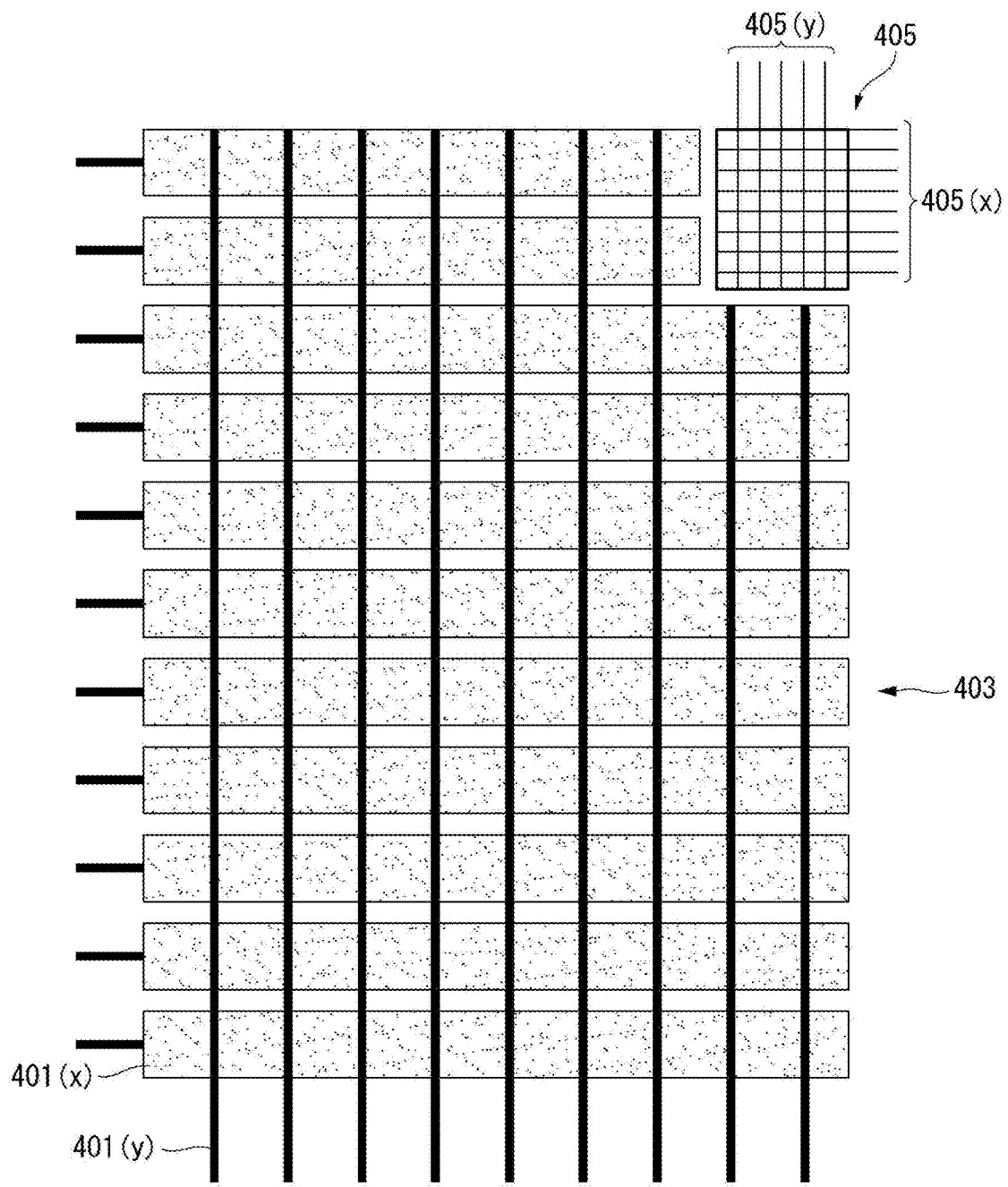
FIG. 1 is a plan view schematically illustrating an arrangement between driving electrodes and sensing electrodes of a capacitive touch sensor according to a related art.
Figure 2:
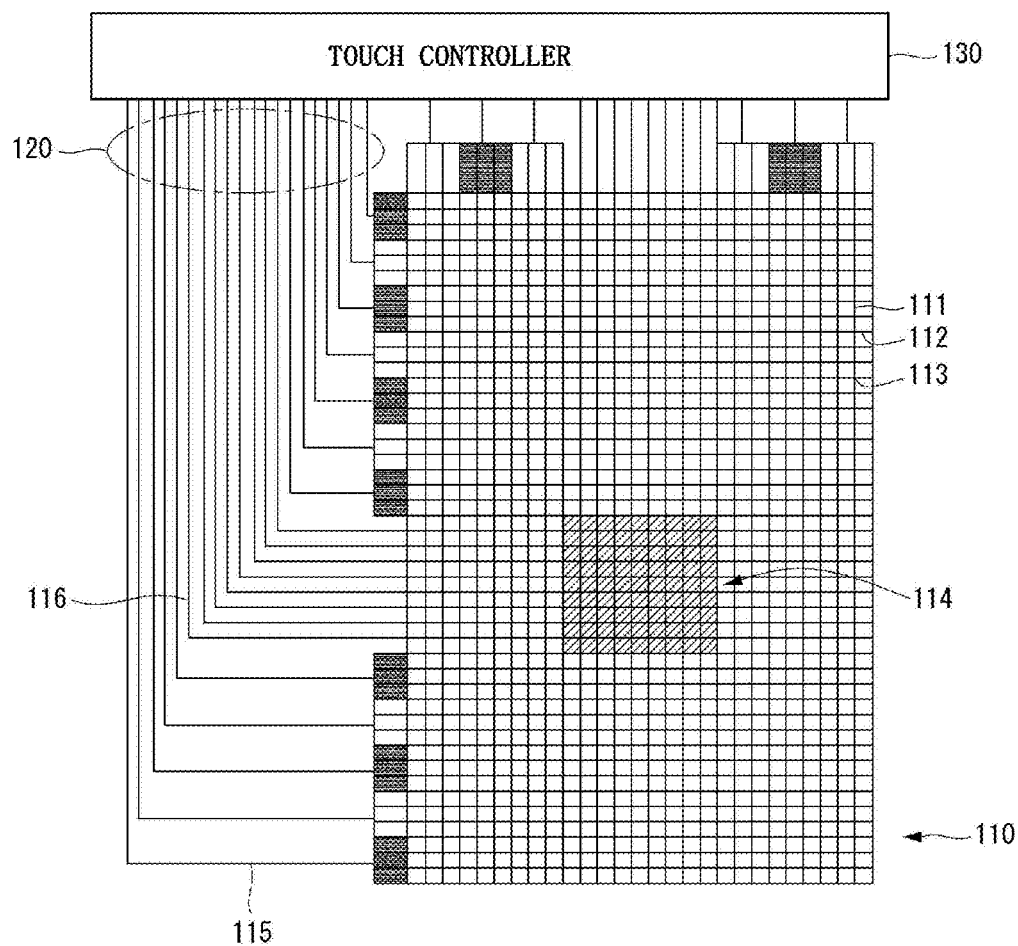
FIG. 2 is a plan view illustrating a fingerprint sensor integrated type capacitive touch screen panel according to another related art.

Hereinafter, exemplary embodiments of this disclosure will be described in detail with reference to the accompanying drawings, wherein same reference numerals may be used to denote the same or substantially the same elements throughout the specification and the drawings.

Figure 3:
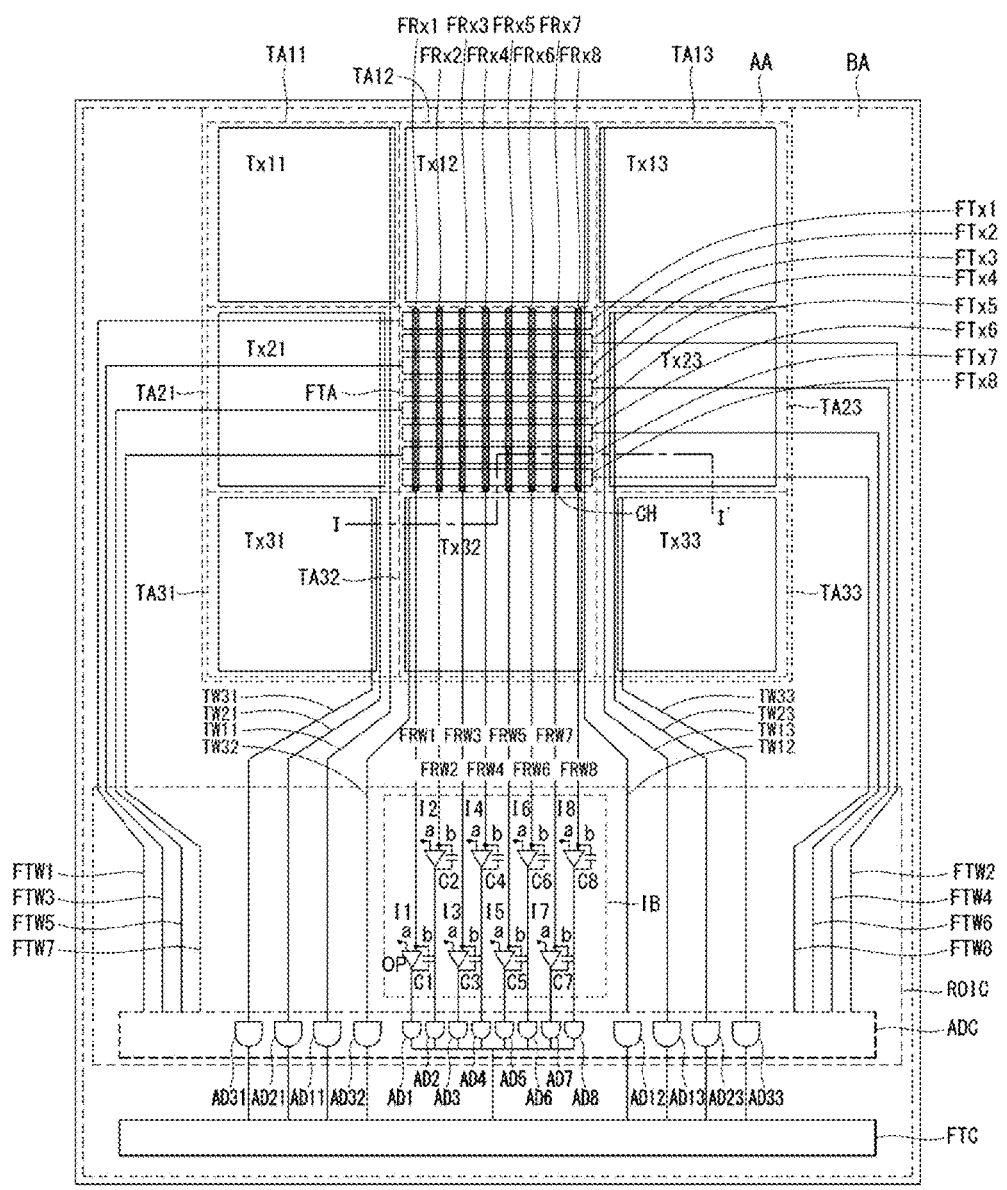
FIG. 3 is a plan view illustrating a fingerprint sensor integrated type capacitive touch screen panel according to one embodiment of the disclosure.

A fingerprint sensor integrated type touch screen panel according to an embodiment of the disclosure is described in detail with reference to FIGS. 3 and 4. FIG. 3 is a plan view illustrating a fingerprint sensor integrated type touch screen panel according to a first embodiment of the disclosure, and FIG. 4 is a cross-sectional view taken along line I-I' of FIG. 3 according to one embodiment.

Figure 4:
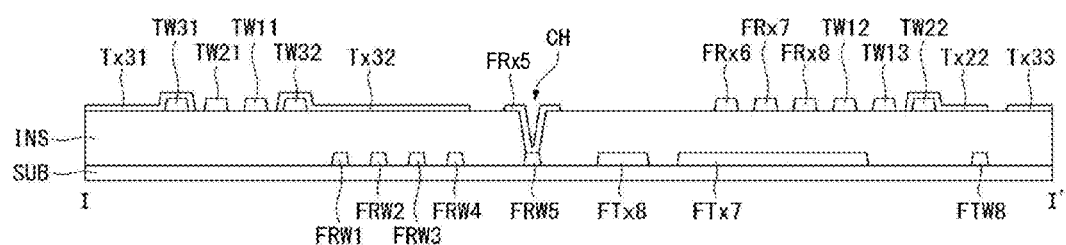
FIG. 4 is a cross-sectional view taken along line I-I' of FIG. 3 according to one embodiment of the disclosure.

Referring to FIGS. 3 and 4, the fingerprint sensor integrated type touch screen panel according to the embodiment of the disclosure includes an active area AA and a bezel area BA. The active area AA includes a plurality of touch areas TA11, TA12, TA13, TA21, TA23, TA31, TA32 and TA33 and at least one fingerprint area FTA. The bezel area BA is disposed outside the active area AA.

In the description of the first embodiment, it is described that there are five touch areas and a single fingerprint and touch area, but it is only described as one example and the invention is not limited thereto. Also, it is described that the fingerprint and touch area FTA is disposed at center portion of the active area AA, but the position of the fingerprint and touch area FTA is not specified thereto. The fingerprint and touch area FTA may be disposed at any position of the active area AA. In this case, another touch area is disposed at the fingerprint and touch area disposed at the center portion.

Touch electrodes Tx11, Tx12, Tx13, Tx21, Tx23, Tx31, Tx32 and Tx33 are disposed in the plurality of touch areas TA11, TA12, TA13, TA21, TA23, TA31, TA32 and TA33, respectively. The touch electrodes Tx11, Tx12, Tx13, Tx21, Tx23, Tx31, Tx32 and Tx33 have a resolution for sensing touch in the active area. Furthermore, in one embodiment each of the touch electrodes Tx11, Tx12, Tx13, Tx21, Tx23, Tx31, Tx32 and Tx33 are substantially the same size. However, in other embodiments the touch electrodes Tx11, Tx12, Tx13, Tx21, Tx23, Tx31, Tx32 and Tx33 can be different sizes from one another. However it is only described as one example and the invention is not limited thereto. For example, the touch areas may be one or more than one. Also, a predetermined number of touch electrodes may be disposed in one touch area, or all of the touch electrodes may be disposed in one touch area if the touch areas are formed of only one touch area.

First combination fingerprint and touch electrodes FTx1 to FTx8 and second combination fingerprint and touch electrodes FRx1 to FRx8 are disposed in the fingerprint and touch area FTA. In one embodiment, the fingerprint and touch area FTA is substantially the same size as each of the touch electrodes Tx11, Tx12, Tx13, Tx21, Tx23, Tx31, Tx32 and Tx33. The first combination fingerprint and touch electrodes FTx1 to FTx8 are arranged in parallel to a first direction (e.g., x-axis direction or horizontal direction). The second combination fingerprint and touch electrodes FRx1 to FRx8 are arranged in parallel to a second direction (e.g., y-axis direction or vertical direction) that crosses the first direction. That is, the first combination fingerprint and touch electrodes FTx1 to FTx8 are disposed to overlap the second combination fingerprint and touch electrodes FRx1 to FRx8 with an insulation layer INS between the first combination fingerprint and touch electrodes FTx1 to FTx8 and the second combination fingerprint and touch electrodes FRx1 to FRx8. As shown in FIG. 3, the touch electrodes Tx11, Tx12, Tx13, Tx21, Tx23, Tx31, Tx32 and Tx33 surround the first combination fingerprint and touch electrodes FTx1 to FTx8 and second combination fingerprint and touch electrodes FRx1 to FRx8. However, in other embodiments the first combination fingerprint and touch electrodes FTx1 to FTx8 and second combination fingerprint and touch electrodes FRx1 to FRx8 can be positioned anywhere in the active area AA.

In one embodiment, the first combination fingerprint and touch electrodes FTx1 to FTx8 and the second combination fingerprint and touch electrodes FRx1 to FRx8 have a resolution for sensing a fingerprint. The resolution of the combination fingerprint and touch electrodes is higher than the resolution of the touch electrodes so that the combination fingerprint and touch electrodes can sense the ridges and valleys of a finger which are very minute in size. Thus, the resolution of the combination fingerprint and touch electrodes is much finer than the resolution of the touch electrodes.

Routing wires TW11, TW12, TW13, TW21, TW23, TW31, TW32 and TW33; FTW1 to FTW8; FRW1 to FRW8 are disposed in the bezel are BA. The routing wires TW11, TW12, TW13, TW21, TW23, TW31, TW32 and TW33; FTW1 to FTW8; FRW1 to FRW8 are connected to the plurality of touch electrodes Tx11, Tx12, Tx13, Tx21, Tx23, Tx31, Tx32 and Tx33, the first fingerprint and touch electrodes FTx1 to FTx8 and the second fingerprint and touch electrodes FRx1 to FRx8, respectively, and extended from the active area AA to the bezel area BA.

A plurality of touch routing wires TW11, TW12, TW13, TW21, TW23, TW31, TW32 and TW33 among the routing wires are connected to the plurality of touch electrodes Tx11, Tx12, Tx13, Tx21, Tx23, Tx31, Tx32 and Tx33, respectively. The plurality of touch routing wires TW11, TW12, TW13, TW21, TW23, TW31, TW32 and TW33 are arranged in parallel to the second direction.

First fingerprint and touch routing wires FTW1 to FTW8 among the routing wires are connected to the electrodes FTx1 to FTx8, respectively. The first fingerprint and touch routing wires FTW1 to FTW8 are arranged in parallel to the first direction. More specifically, 1-1 fingerprint and touch routing wires FTW1, FTW3, FTW5 and FTW7 are connected to 1-1 fingerprint and touch electrodes FTx1, FTx3, FTx5 and FTx7 disposed in odd-numbered rows, respectively. 1-2 fingerprint and touch routing wires FTW2, FTW4, FTW6 and FTW8 are connected to 1-2 fingerprint and touch electrodes FTx2, FTx4, FTx6 and FTx8 disposed in even-numbered rows, respectively.

The fingerprint and touch routing wires FTW1 to FTW8 are disposed in a left bezel area and/or a right bezel area. FIG. 3 shows that the fingerprint and touch routing wires FTW1 to FTW8 are disposed in both of the left bezel area and the right bezel area. As shown in FIG. 3, the 1-1 fingerprint and touch routing wires FTW1, FTW3, FTW5 and FTW7 are extended from the active area AA to the left bezel area, and the 1-2 fingerprint and touch routing wires FTW2, FTW4, FTW6 and FTW8 are also extended from the active area AA to the right bezel area. Otherwise, the 1-1 fingerprint and touch routing wires FTW1, FTW3, FTW5 and FTW7 may be extended from the active area AA to the right bezel area, and the 1-2 fingerprint and touch routing wires FTW2, FTW4, FTW6 and FTW8 may be extended from the active area AA to the left bezel area.

The 1-1 fingerprint and touch routing wires FTW1, FTW3, FTW5 and FTW7 are disposed to overlap the touch electrode Tx21 positioned at left side of the fingerprint and touch area FTA with the insulation layer INS between the touch electrode Tx21 and the 1-1 fingerprint and touch routing wires FTW1, FTW3, FTW5 and FTW7. The 1-2 fingerprint and touch routing wires FTW2, FTW4, FTW6 and FTW8 are disposed to overlap the touch electrode Tx23 positioned at right side of the fingerprint and touch area FTA with the insulation layer INS between the touch electrode Tx23 and 1-2 fingerprint and touch routing wires FTW2, FTW4, FTW6 and FTW8.

Second fingerprint and touch routing wires FRW1 to FRW8 among the routing wires are connected to the second fingerprint and touch electrodes FRx1 to FRx8, respectively. The second fingerprint and touch routing wires FRW1 to FRW8 are arranged in parallel to the second direction. The second fingerprint and touch electrodes FRx1 to FRx8 are connected to the second fingerprint and touch electrodes FRx1 to FRx8 via contact holes CH passing through the insulation layer INS, respectively.

The fingerprint sensor integrated type touch screen panel according to the embodiment of the disclosure further includes a readout IC ROIC and a fingerprint and touch controller FTC.

The readout IC ROIC includes an integration block IB and an analog-to-digital (A/D) conversion block ADC. The integration block IB includes integrators I1 to I8 configured to integrate analog fingerprint and touch sensing data corresponding to fingerprint and touch sensing voltages received through the second fingerprint and touch routing wires FRW1 to FRW8, respectively. The A/D conversion block ADC includes first A/D converters AD11 to AD33 and second A/D converters AD1 to AD8. The first A/D converters AD11 to AD33 convert first analog sensing data corresponding to touch sensing voltages received through the touch routing wires TW11 to TW33 to first digital sensing data, respectively. The second A/D converters AD1 to AD8 convert second analog sensing data corresponding to the integrated analog fingerprint and touch sensing data received through the integrators I1 to I8 to second digital data, respectively.

Each of first to eighth integrators I1 to I8 in the integration block IB has an operational amplifier OP and a capacitor C. The operational amplifier OP has a first input terminal connected to a reference voltage source (not shown), a second input terminal connected to one of the second fingerprint and touch routing wires FRW1 to FRW8, and an output terminal connected to the A/D conversion block ADC. Each of the capacitors C1 to C8 is connected in parallel to the operational amplifier OP. That is, each of the capacitors C1 to C8 is connected between the second input terminal b of the operational amplifier OP and the output terminal of the operational amplifier OP.

The connections relationship between the first to eighth integrators I1 to I8 and the second fingerprint/touch routing wires FRW1 to FRW8 are as follows.

The reference voltage source (not shown) is connected to the first input terminal a of the first integrator I1, the 2-1 fingerprint and touch routing wire FRW1 is connected to the second input terminal b of the first integrator I1, and the capacitor C1 is connected between the second input terminal b and the output terminal of the first integrator I1.

The reference voltage source is connected to the first input terminal a of the first integrator I2, the 2-2 fingerprint and touch routing wire FRW2 is connected to the second input terminal b of the first integrator I2, and the capacitor C2 is connected between the second input terminal b and the output terminal of the second integrator I2.

The reference voltage source is connected to the first input terminal a of the first integrator I3, the 2-3 fingerprint and touch routing wire FRW3 is connected to the second input terminal b of the first integrator I3, and the capacitor C3 is connected between the second input terminal b and the output terminal of the second integrator I3.

The reference voltage source is connected to the first input terminal a of the first integrator I4, the 2-4 fingerprint and touch routing wire FRW4 is connected to the second input terminal b of the first integrator I4, and the capacitor C4 is connected between the second input terminal b and the output terminal of the second integrator I4.

The reference voltage source is connected to the first input terminal a of the first integrator I5, the 2-5 fingerprint and touch routing wire FRW5 is connected to the second input terminal b of the first integrator I5, and the capacitor C5 is connected between the second input terminal b and the output terminal of the second integrator I5.

The reference voltage source is connected to the first input terminal a of the first integrator I6, the 2-6 fingerprint and touch routing wire FRW6 is connected to the second input terminal b of the first integrator I6, and the capacitor C6 is connected between the second input terminal b and the output terminal of the second integrator I6.

The reference voltage source is connected to the first input terminal a of the first integrator I7, the 2-7 fingerprint touch routing wire FRW7 is connected to the second input terminal b of the first integrator I7, and the capacitor C7 is connected between the second input terminal b and the output terminal of the second integrator I7.

The reference voltage source is connected to the first input terminal a of the first integrator I8, the 2-8 fingerprint and touch routing wire FRW8 is connected to the second input terminal b of the first integrator I8, and the capacitor C8 is connected between the second input terminal b and the output terminal of the second integrator I8.

During a touch operation, the readout IC ROIC supplies touch driving voltages to the touch electrodes Tx11, Tx12, Tx13, Tx21, Tx23, Tx31, Tx32 and Tx33, respectively, senses each of the touch electrodes Tx11, Tx12, Tx13, Tx21, Tx23, Tx31, Tx32 and Tx33, obtains first analog data corresponding to first sensing voltages sensed from each of the touch electrodes Tx11, Tx12, Tx13, Tx21, Tx23, Tx31, Tx32 and Tx33 via the routing wires TW11, TW12, TW13, TW21, TW23, TW31, TW32 and TW33, converts the first analog data to first digital data, and supplies the first digital data to the fingerprint and touch controller FTC.

During the touch operation, the readout IC ROIC supplies the touch driving voltages to the first combination fingerprint and touch routing electrodes FTx1 to FTx8 through the first fingerprint and touch routing wires FTW1 to FTW8, respectively, obtains second analog data corresponding to second sensing voltages sensed from each of the second fingerprint and touch routing electrodes FRx1 to FRx8, converts the second analog data to second digital data, and supplies the second digital data to the fingerprint/touch controller FTC.

Alternatively, the readout IC ROIC may group the second fingerprint and touch routing wires FRW1 to FRxW8 through switching elements so that the second fingerprint and touch routing wires FRW1 to FRx8 are connected to each other, supplies the touch driving voltages to the second combination fingerprint and touch routing electrodes FRx1 to FRx8 acted like as one electrode, sense the second fingerprint and touch routing electrodes FRx1 to FRx8, obtains a second analog data corresponding to a second sensing voltages sensed from the group of the second combination fingerprint and touch routing electrodes FRx1 to FRx8, converts the second analog data to a second digital data, and supplies to the second digital data to the fingerprint and touch controller FTC. In this regard, it will be described in detail later with reference to FIGS. 5 and 6.

During the touch operation, the readout IC ROIC also supplies the touch driving voltage to the second fingerprint and touch electrodes FRx1 to FRx8 to prevent parasitic capacitance from being generated between the first fingerprint and touch electrodes FTx1 to FTx8 and the second fingerprint and touch routing electrodes FRx1 to FRx8.

Accordingly, it is possible to obtain the first sensing voltages corresponding to the plurality of touch areas TA11, TA12, TA13, TA21, TA23, TA31, TA32 and TA33 and the second sensing voltages corresponding to the fingerprint and touch area FTA, thereby leading an effect to perceive touch positions accurately without any dead zone in the active area AA.

On the other hand, during a fingerprint operation, the readout IC ROIC supplies fingerprint driving voltages to the first combination fingerprint and touch electrodes FTx1 to FTx8. The integrators I1 to I8 of the integration block IB integrates third analog data corresponding to third sensing voltages received through the fingerprint and touch routing wires FRW1 to FRW8 after sensing the second combination fingerprint and touch electrodes FRx1 to FRx8. The second A/D converters AD1 to AD8 convert third analog data integrated by the integrators I1 to I8 to third digital data and output the third digital data. It is possible to improve sensing sensibility of the fingerprint because electric charges sensed from the second combination fingerprint and touch electrodes FRx1 to FRx8 are accumulated into the capacitors C1 to C8 of the integrators I1 to I8 if the second combination fingerprint and touch electrodes FRx1 to FRx8 are repeatedly sensed. The readout IC ROIC supplies the third digital data output from the A/D conversion block ADC to the fingerprint and touch controller FTC.

During the touch operation, the fingerprint and touch controller FTC analyzes the first and second digital data (corresponding to the first and second sensing voltages) received from the readout IC ROIC using a publicly known touch recognition algorithm, and calculates coordinate values of touch positions. During the fingerprint operation, the fingerprint and touch controller FTC analyzes the third digital data (corresponding to the third sensing voltages) received from the readout IC ROIC using a publicly known fingerprint recognition algorithm, and recognizes fingerprints.

The fingerprint sensor integrated type touch screen panel according to the embodiment of the disclosure is operated in a time division method as mentioned above. Generally, in the time division method a touch period of the fingerprint sensor integrated type touch screen panel includes both a touch driving mode for sensing touch and a fingerprint mode for sensing a fingerprint. The touch driving mode and the fingerprint mode do not overlap in the touch period. During the touch driving mode, the FTC applies the touch driving voltage for sensing touch to the touch electrodes and the combination fingerprint and touch electrodes. During the fingerprint mode, the FTC applies the fingerprint driving voltage for sensing a fingerprint to the combination fingerprint and touch electrodes. However, the fingerprint sensor integrated type capacitive touch screen panel may be operated in the manner of that it is operated according to the fingerprint driving method if it receives an instruction of a fingerprint operation from outside while it is operated according to the touch driving method.

Next, a cross-sectional construction of the fingerprint sensor integrated type touch screen panel according to the embodiment of the invention will be described in detail mainly with FIG. 4

The first combination fingerprint and touch electrodes FTx1 to FTx8 are disposed in parallel to the first direction on a first surface of a substrate SUB, and the first fingerprint and touch routing wires FTW1 to FTW8 extended from the first combination fingerprint and touch electrodes FTx1 to FTx8 are disposed on the same surface of the substrate SUB as the first combination fingerprint and touch electrodes FTx1 to FTx8 (e.g., the first surface). The second fingerprint and touch routing wires FRW1 to FRW8 are disposed in parallel to the second direction crossing over the first direction and are separated from the first combination fingerprint and touch electrodes FTx1 to FTx8 and the fingerprint and touch routing wires FRW1 to FRW8 on the first surface of the substrate.

The first fingerprint and touch electrodes FTx1 to FTx8 are made of transparent conductive material such as ITO (Indium Tin Oxide), IZO (Indium Zinc Oxide), GZO (Gallium-doped Zinc Oxide), or metal material having lower reflectivity such as chrome oxide, or blackened metal material such as Mo.

The first fingerprint and touch routing wires FTW1 to FTW8 and the fingerprint and touch routing wires FRW1 to FRW8 are made of metal material having lower resistance.

The insulation layer INS is disposed on the one surface of the substrate SUB to cover the first fingerprint and touch electrodes FTx1 to FTx8, the first fingerprint and touch routing wires FTW1 to FTW8 and the second fingerprint and touch routing wires FRW1 to FRW8. The insulation layer INS includes a plurality of contact holes CH passing through the insulation layer INS to expose portions of the second fingerprint/touch routing wires FRW1 to FRW8. The insulation layer INS is made of inorganic material such as silicon oxide or silicon nitride, or organic material such as acryl-based resin.

In the touch areas TA on the insulation layer INS, the touch electrodes Tx11, Tx12, Tx13, Tx21, Tx23, Tx31, Tx32 and Tx33 and the touch routing wires TW11, TW12, TW13, TW21, TW23, TW31, TW32 and TW33 respectively extended from the touch electrodes Tx11, Tx12, Tx13, Tx21, Tx23, Tx31, Tx32 and Tx33 are disposed. The touch routing wires TW11, TW12, TW13, TW21, TW23, TW31, TW32 and TW33 are arranged in the second direction.

The touch electrodes Tx11, Tx12, Tx13, Tx21, Tx23, Tx31, Tx32 and Tx33 and the touch routing wires TW11, TW12, TW13, TW21, TW23, TW31, TW32 and TW33 extended from the touch electrodes Tx11, Tx12, Tx13, Tx21, Tx23, Tx31, Tx32 and Tx33 may be made of transparent conductive material such as ITO, IZO and GZO.

In the fingerprint and touch area FTA on the insulation layer INS, the second fingerprint and touch electrodes FRx1 to FRx8 are arranged in the second direction without contacting with the touch electrodes Tx11, Tx12, Tx13, Tx21, Tx23, Tx31, Tx32 and Tx33 and the touch routing wires TW11, TW12, TW13, TW21, TW23, TW31, TW32 and TW33. The second fingerprint and touch electrodes FRx1 to FRx8 are made of transparent conductive material such as ITO, IZO and GZO, or metal material having lower reflectivity such as chrome oxide, or blackened metal material such as Mo.

Next, a fingerprint integrated type touch screen panel according to a second embodiment of the disclosure will be described with reference to FIGS. 5 and 6.

Figure 5:
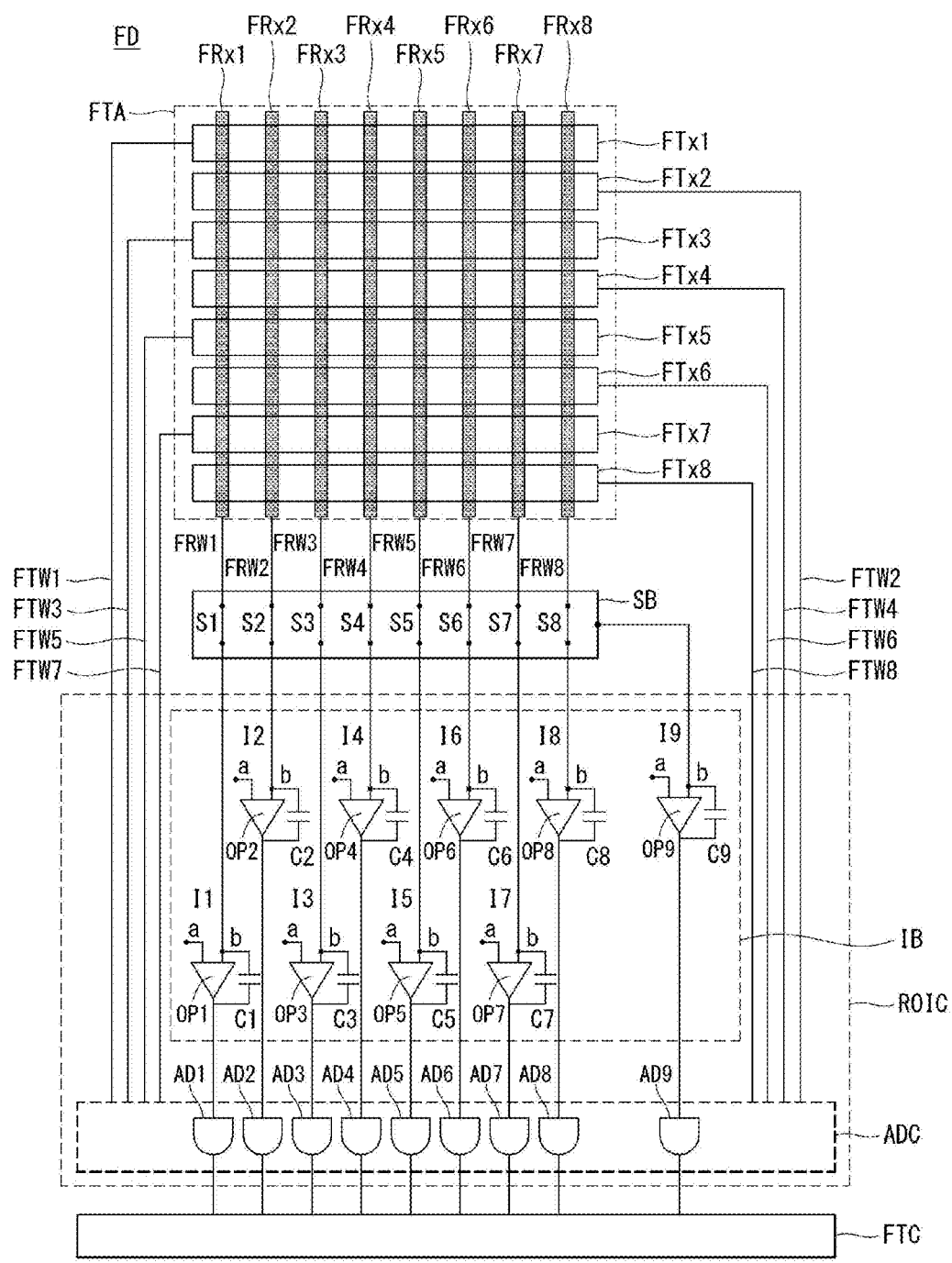
FIG. 5 is a drawing for describing a working principle in that fingerprint/touch region of the fingerprint sensor integrated type capacitive touch screen panel is acted at a fingerprint mode according to one embodiment of the disclosure.
Figure 6:
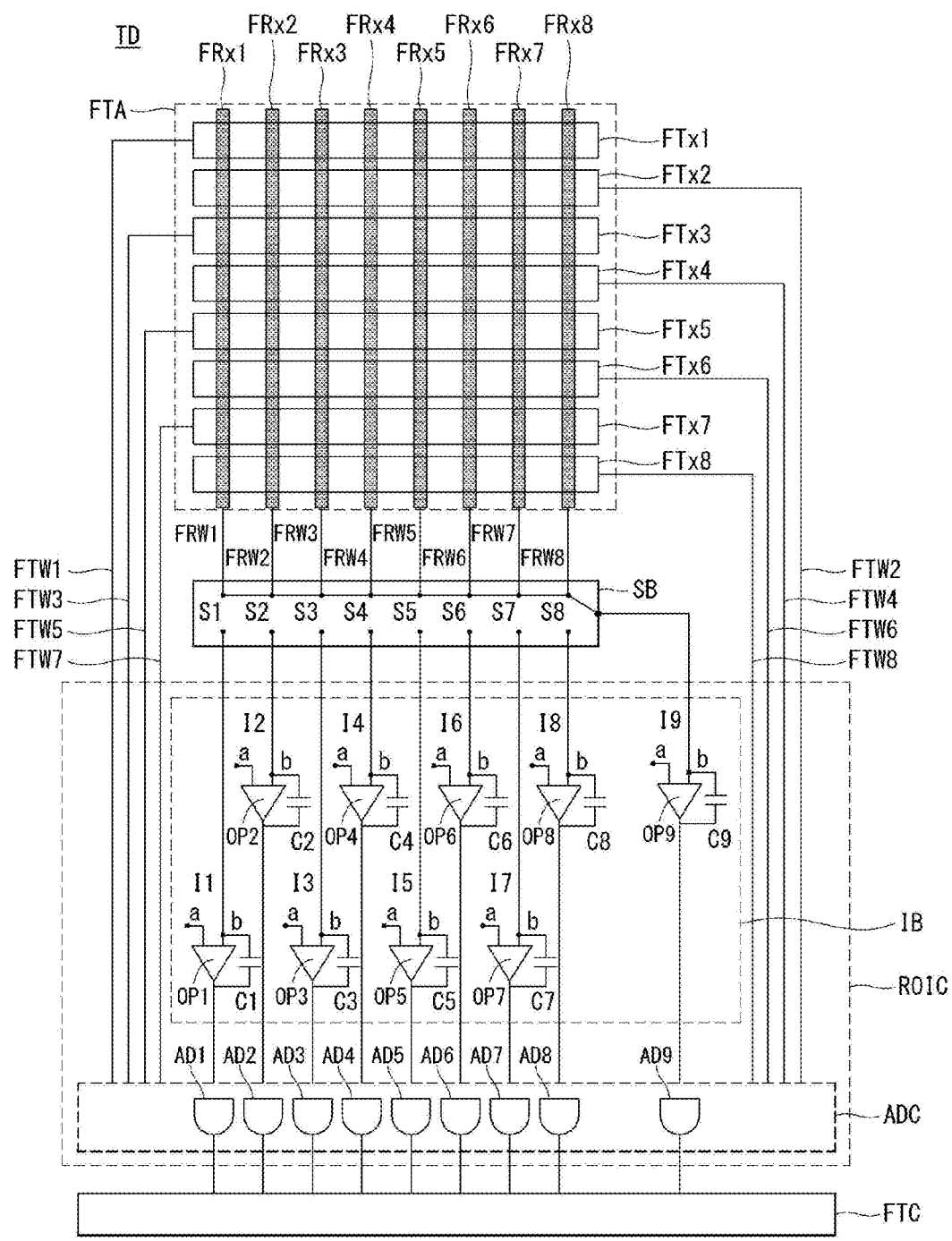
FIG. 6 is drawing for describing a working principle in that fingerprint/touch region of the fingerprint sensor integrated type capacitive touch screen panel is acted at a touch mode according to one embodiment of the disclosure.

Referring to FIGS. 5 and 6, the fingerprint integrated type touch screen panel according to the second embodiment of the disclosure is different from the fingerprint integrated type touch screen panel according to the first embodiment of the disclosure shown in FIG. 3 in that a switching block SB is disposed between the fingerprint and touch area FTA and the readout IC ROIC, and the readout IC ROIC includes a ninth integrator I9. Therefore, it will be described about the difference in order to obviate repeated description.

In examples of FIGS. 5 and 6, the ninth integrator I9 includes an operational amplifier OP9 having two input terminals a and b, and one output terminal, and a capacitor C9 connected between second input terminal and the output terminal, like as the first to eighth integrators I1 to I8. The reference voltage source (not shown) is connected to the first input terminal a of the operational amplifier OP9, an eighth switching element S8 of the switching block SB is connected to the second input terminal b of the operational amplifier OP9 or floated, the A/D converter AD9 of the A/D conversion block ADC is connected to the output terminal of the operational amplifier OP9.

The switching block SB includes first to eighth switching element S1 to S8.

The first switching element S1 is switched to connect the 2-1 fingerprint and touch routing wire FRW1 to the second input terminal b of the first operational amplifier OP1 in the first integrator I1 or to the 2-2 fingerprint and touch routing wire FRW2.

The second switching element S2 is switched to connect the 2-2 fingerprint and touch routing wire FRW2 to the second input terminal b of the second operational amplifier OP2 in the second integrator I2 or to the 2-3 fingerprint and touch routing wire FRW3.

The third switching element S3 is switched to connect the 2-3 fingerprint and touch routing wire FRW3 to the second input terminal b of the third operational amplifier OP3 in the third integrator I3 or to the 2-4 fingerprint and touch routing wire FRW4.

The fourth switching element S4 is switched to connect the 2-4 fingerprint and touch routing wire FRW4 to the second input terminal b of the fourth operational amplifier OP4 in the fourth integrator I4 or to the 2-5 fingerprint and touch routing wire FRW5.

The fifth switching element S5 is switched to connect the 2-5 fingerprint and touch routing wire FRW5 to the second input terminal b of the fifth operational amplifier OP5 in the fifth integrator I5 or to the 2-6 fingerprint and touch routing wire FRW6.

The sixth switching element S6 is switched to connect the 2-6 fingerprint and touch routing wire FRW6 to the second input terminal b of the sixth operational amplifier OP6 in the sixth integrator I6 or to the 2-7 fingerprint and touch routing wire FRW7.

The seventh switching element S7 is switched to connect the 2-7 fingerprint and touch routing wire FRW7 to the second input terminal b of the seventh operational amplifier OP7 in the seventh integrator I7 or to the 2-8 fingerprint and touch routing wire FRW8.

The eighth switching element S8 is switched to connect the 2-8 fingerprint/touch routing wire FRW8 to the second input terminal b of the eighth operational amplifier OP8 in the seventh integrator I8 or to the second input terminal b of the ninth operational amplifier OP9.

First of all, at a fingerprint mode (that is, during a fingerprint operation), an operation of the fingerprint integrated type touch screen panel according to the embodiment of the disclosure will be described with reference FIG. 5.

During the fingerprint mode, the readout IC ROIC supplies fingerprint driving voltages to the first combination fingerprint and touch electrodes FTx1 to FTx8 via the first fingerprint and touch routing wires FTW1 to FTW8, respectively. The readout IC ROIC supplies a first control signal to the switching block SB. The first to eighth switching elements S1 to S8 of the switching block SB are switched to connect the second fingerprint and touch routing wires FRW1 to FRW8 to the first to eighth integrators I1 to I8, respectively. The first to eighth integrators I1 to I8 store the sensing voltages received through the second fingerprint and touch routing wires FRW1 to FRW8 on the capacitors C1 to C8, respectively, and integrate analog data corresponding to the sensing voltages, respectively. It is possible to improve sensing sensibility of the fingerprint because electric charges sensed from the second combination fingerprint and touch electrodes FRx1 to FRx8 are accumulated into the capacitors C1 to C8 of the integrators I1 to I8 if the second fingerprint and touch electrodes FRx1 to FRx8 are repeatedly sensed. The A/D converters AD1 to AD8 of the A/D conversion block ADC convert the analog data output from the integrators I1 to I8 to digital data, respectively.

During the fingerprint mode, fingerprint and touch controller FTC analyzes the digital data received from A/D conversion block ADC of the readout IC ROIC using a publicly known fingerprint recognition algorism, and recognizes fingerprints.

Next, during a touch mode (that is, during a touch operation), an operation of the fingerprint integrated type touch screen panel according to embodiment of the invention will be described with reference FIG. 6.

At the touch mode, the readout IC ROIC supplies a second control signal to the switching block SB. The first to eighth the switching elements S1 to S8 of the switching block SB are switched to connect the second fingerprint and touch routing wires FRW1 to FRW8 to each other. The readout IC ROIC supplies a touch driving voltage to the first combination fingerprint and touch electrodes FTx1 to FTx8 through the first fingerprint and touch routing wires FTW1 to FTW8. The sensing voltage obtained from the second combination fingerprint and touch electrodes FRx1 to FRx8 after sensing the second fingerprint and touch electrodes FRx1 to FRx8 is supplied to the ninth integrator I9 in the integration block IB through the second fingerprint and touch routing wires FRW1 to FRW8 and the switching block SB. The ninth integrator I9 stores an analog data corresponding to the sensing voltage received through the second fingerprint and touch routing wires FRW1 to FRW8 on the capacitor C9 and integrates the analog data. It is possible to improve sensing sensibility of touch events on the fingerprint/touch area FTA because electric charges sensed from the second fingerprint and touch electrodes FRx1 to FRx8 are accumulated into the capacitor C9 of the integrators I9 if the second fingerprint and touch electrodes FRx1 to FRx8 are repeatedly sensed.

Also, during the touch mode, the readout IC ROIC also supplies the touch driving voltage to the first combination fingerprint and touch electrodes FTx1 to FTx8 to prevent parasitic capacitance from being generated between the first combination fingerprint and touch electrodes FTx1 to FTx8 and the second combination fingerprint and touch routing electrodes FRx1 to FRx8. The A/D converter AD9 of the A/D conversion block ADC converts the analog data output from the integrator I9 to digital data.

At the touch mode, the fingerprint/touch controller FTC analyzes the digital data (corresponding the sensing voltages) received from the A/D converter AD9 of the A/D conversion block ADC using a publicly known touch recognition algorism, and calculates coordinate values of touch positions.

In the description mentioned above, the readout IC ROIC supplies the fingerprint driving voltages (or fingerprint driving signal), the touch driving voltage (or touch driving signal), the first control signal and the second control signal, but the invention is not limited thereto. They may be supplied by the fingerprint and touch controller FTC or an individual power supplier.

According to exemplary embodiments of the disclosure, it is possible to design the fingerprint sensor integrated type touch screen panel having a narrow bezel area because it is unnecessary to have a fingerprint sensor region in the bezel area.

Also, it is possible to prevent a dead zone from being generated in an active area of the fingerprint sensor integrated type touch screen panel because fingerprint and touch electrodes are arranged in a fingerprint and touch area of the display area to implement the touch and fingerprint recognitions.

Also, it is possible to prevent touch sensibilities of the fingerprint sensor integrated type touch screen panel from being degraded because the touch electrodes consist of large patterns (low resolution) and the fingerprint and touch patterns consist of fine patterns (high resolution).

Also, according to exemplary embodiments of the invention, the integrators I1 to I8 for fingerprint sensing and the integrator I9 are independently provided in the integration block IB to use them independently. Accordingly, it is possible to enhance efficiency of the device. For example, it is possible to improve touch accuracy by reducing integration perform number during the touch operation and setting voltage level of the touch driving voltage lower than that of the fingerprint driving voltage.

Although exemplary embodiments have been illustrated and described, it will be apparent to those skilled in the art that various changes and modifications can be made without departing from the spirit of this disclosure. For example, it should be understood that the number of the touch electrodes, the fingerprint/electrodes, the integrators, the switching elements routing wires, various wires and so on is exemplary and explanatory, and is not intended to limit the scope of the invention. Thus, it is intended that embodiments of the invention cover the modifications and variations of this invention provided they come within the scope of the appended claims and their equivalents.

What is claimed is:

1. A touch sensing device comprising:
   a plurality of touch electrodes located in an active area of the touch sensing device, the plurality of touch electrodes having a first resolution for sensing touch in the active area;
   a plurality of combination touch and fingerprint electrodes located in at least one fingerprint and touch area in the active area of the touch sensing device, the plurality of combination touch and fingerprint electrodes having a second resolution for sensing both touch and a fingerprint in the at least one fingerprint and touch area, the second resolution of the plurality of combination touch and fingerprint electrodes higher than the first resolution of the plurality of touch electrodes;

a first plurality of routing lines connected to the plurality of touch electrodes;
a second plurality of routing lines connected to the plurality of combination touch and fingerprint electrodes; and
a touch and fingerprint controller that respectively applies via the first plurality of routing lines and the second plurality of routing lines a touch driving voltage for sensing touch to the plurality of touch electrodes and the plurality of combination touch and fingerprint electrodes during a touch driving mode of a touch period of the touch sensing device, and the touch and fingerprint controller applying via the second plurality of routing lines a fingerprint driving voltage for sensing a fingerprint to the plurality of combination touch and fingerprint electrodes during a fingerprint mode of the touch period, the fingerprint mode not overlapping with the touch driving mode,
wherein the plurality of combination touch and fingerprint electrodes include a plurality of first combination touch and fingerprint electrodes on a substrate and a plurality of second combination touch and fingerprint electrodes on an insulation layer covering the plurality of first combination touch and fingerprint electrodes,
wherein the second plurality of routing lines include a first set of routing lines connected to the plurality of first combination touch and fingerprint electrodes and a second set of routing lines, the first set of routing lines connected to the plurality of second combination touch and fingerprint electrodes,
wherein the insulation layer covers the plurality of first combination touch and fingerprint electrodes, the first set of routing lines, and the second set of routing lines; and
wherein the plurality of touch electrodes, the plurality of second combination fingerprint and touch electrodes, and the first plurality of routing lines are formed over the insulation layer.

2. The touch sensing device of claim 1, wherein the plurality of touch electrodes surround the plurality of combination touch and fingerprint electrodes in the active area.

3. The touch sensing device of claim 1, wherein the plurality of first combination touch and fingerprint electrodes arranged in a first direction and the plurality of second combination touch and fingerprint electrodes arranged in a second direction that crosses the first direction.

4. The touch sensing device of claim 1, wherein the first plurality of routing lines and the second plurality of routing lines are located in a bezel area of the touch sensing device that surrounds the active area.

5. The touch sensing device of claim 4, wherein the first plurality of routing lines and the second plurality of routing lines extend from the bezel area of the touch sensing device to the active area of the touch sensing device.

6. The touch sensing device of claim 1, further comprising:
an integration block comprising a plurality of integrators that integrate sensing data received from the plurality of second combination touch and fingerprint electrodes via the second set of routing lines, each of the plurality of integrators including a capacitor connected to an operational amplifier; and
an analog-to-digital conversion block comprising a plurality of analog-to-digital converters that receive the integrated sensing data from the integration block and convert the integrated sensing data into digital data that is transmitted to the touch and fingerprint controller.

7. The touch sensing device of claim 6, wherein the sensing data comprises touch sensing data and wherein during the touch driving mode the touch and fingerprint controller supplies the touch driving voltage to the plurality of first combination touch and fingerprint electrodes via the first set of routing lines and each of the plurality of integrators receive the touch sensing data from a corresponding one of the plurality of second combination touch and fingerprint electrodes via one of the second set of routing lines.

8. The touch sensing device of claim 7, wherein during the touch driving mode of the touch period of the touch sensing device the touch and fingerprint controller also supplies the touch driving voltage to the plurality of second combination touch and fingerprint electrodes via the second set of routing lines.

9. The touch sensing device of claim 6, wherein during the fingerprint mode of the touch period of the touch sensing device the touch and fingerprint controller supplies the fingerprint driving voltage to the plurality of first combination touch and fingerprint electrodes via the first set of routing lines and each of the plurality of integrators receive fingerprint sensing data from a corresponding one of the plurality of second combination touch and fingerprint electrodes via one of the second set of routing lines.

10. The touch sensing device of claim 6, further comprising:
a switching block connected between the plurality of combination touch and fingerprint electrodes and the integration block;
wherein during the fingerprint mode the touch and fingerprint controller supplies the fingerprint driving voltage to the plurality of first combination touch and fingerprint electrodes via the first set of routing lines and the switching block connects each of the plurality of integrators to a corresponding one of the plurality of second combination touch and fingerprint electrodes, and each of the plurality of integrators receive touch sensing data from the corresponding one of the plurality of second combination touch and fingerprint electrodes.

11. The touch sensing device of claim 10, wherein during the touch driving mode the touch and fingerprint controller supplies the touch driving voltage to the plurality of first combination touch and fingerprint electrodes via the first set of routing lines, and wherein the switching block connects together the second set of routing wires and outputs the touch sensing data from the plurality of second combination touch and fingerprint electrodes to a single integrator included in the integration block.

12. The touch sensing device of claim 11, wherein during the touch driving mode of the touch period of the touch sensing device the touch and fingerprint controller also supplies the touch driving voltage to the plurality of second combination touch and fingerprint electrodes via the second set of routing lines.

13. The touch sensing device of claim 1, wherein each of the plurality of touch electrodes are a substantially same size.

14. The touch sensing device of claim 13, wherein the plurality of combination touch and fingerprint electrodes are located in a portion of the touch sensing device having a size that is substantially the same as the size of each of the plurality of touch electrodes.

15. The touch sensing device of claim 1, wherein the plurality of first combination touch and fingerprint electrodes, the first set of routing lines, and the second set of routing lines are formed over a substrate.

16. The touch sensing device of claim 1, further comprising:
   a contact hole in the insulation layer, the contact hole electrically connecting together one of the second set of routing lines and one of the plurality of second combination and fingerprint and touch electrodes.

* * * * *